United States Patent
Denoue et al.

(10) Patent No.: US 7,508,382 B2
(45) Date of Patent: Mar. 24, 2009

(54) FORCE-FEEDBACK STYLUS AND APPLICATIONS TO FREEFORM INK

(75) Inventors: Laurent Denoue, Palo Alto, CA (US); Jonathan T. Foote, Menlo Park, CA (US)

(73) Assignee: Fuji Xerox Co., Ltd., Tokyo (JP)

(*) Notice: Subject to any disclaimer, the term of this patent is extended or adjusted under 35 U.S.C. 154(b) by 632 days.

(21) Appl. No.: 10/833,062

(22) Filed: Apr. 28, 2004

(65) Prior Publication Data

US 2005/0243072 A1 Nov. 3, 2005

(51) Int. Cl.
G06F 3/033 (2006.01)
G06F 3/041 (2006.01)
G06F 3/046 (2006.01)

(52) U.S. Cl. .................. 345/179; 178/18.01; 178/18.03; 178/19.01; 178/19.04; 345/173

(58) Field of Classification Search .................. 345/179, 345/173; 178/18.01, 18.03, 19.01, 19.04
See application file for complete search history.

(56) References Cited

U.S. PATENT DOCUMENTS

| | | | | |
|---|---|---|---|---|
| 3,376,551 | A * | 4/1968 | Armbruster | 382/188 |
| 4,471,162 | A * | 9/1984 | Aono et al. | 178/18.07 |
| 4,667,182 | A * | 5/1987 | Murphy | 340/407.2 |
| 6,088,019 | A * | 7/2000 | Rosenberg | 345/156 |
| 6,335,727 | B1 * | 1/2002 | Morishita et al. | 345/179 |
| 6,429,846 | B2 * | 8/2002 | Rosenberg et al. | 345/179 |
| 2002/0097223 | A1 * | 7/2002 | Rosenberg | 345/157 |
| 2002/0180714 | A1 * | 12/2002 | Duret | 345/179 |

OTHER PUBLICATIONS

Webster's II New Riverside Dictionary, 1996, Houghton Mifflin Company, revised edition, p. 674.*
"*The Moose: A Haptic User Interface for Blind Persons*". Maura Sile O'Modhrain, Brent Gillespie (Report No. Stan-M95; CCRMA, Stanford 1995).
"*A haptically enhanced scrollbar: Force-Feedback as a means of reducing the problems associated with scrolling*", McGee, Marilyn Rose, (1999). First PHANTOM Users Research Symposium, May, Deutsches Krebsforschungszentrum, Heidelberg, Germany.

* cited by examiner

Primary Examiner—My-Chau T Tran
(74) Attorney, Agent, or Firm—Sughrue Mion, PLLC

(57) ABSTRACT

This invention relates to a force-feedback apparatus which includes a stylus that is equipped with an electromagnetic device or a freely rotating ball. The stylus is functionally coupled to a controller which is capable of exerting a magnetic field to the electromagnetic device or to the rotating ball, which results in a force being created between the stylus and a surface. This invention also relates to a method of using a force-feedback stylus including moving a force-feedback stylus over a surface, controlling a force-feedback device via a controller coupled to the force-feedback stylus and applying a force to the force-feedback stylus via the force-feedback device, the force being determined for at least features on the surface.

22 Claims, 3 Drawing Sheets

FORCE-FEEDBACK STYLUS AND APPLICATIONS TO FREEFORM INK

BACKGROUND OF THE INVENTION

1. Field of Invention

This invention relates generally to the interfacing with computer and mechanical devices by a user, and more specifically to devices used to interface with computer systems and electronic devices which provide haptic feedback to a user.

2. Description of Related Art

People every day interface with electronic and mechanical devices in a variety of applications to accomplish a variety of functions. Thus, there is a constant need for a more natural, easy to use, and informative interface. Currently, interfacing with computer generated environments, such as, for instance, games, simulations, and application programs, is generally performed with input devices such as mice and track balls which are often used to control a cursor within a graphical environment and provide input in such applications.

In some applications, interface devices such as force-feedback or tactile feedback are also provided to the user. These devices are known as "haptic feedback" devices. For instance, haptic versions of joysticks, mice, game pads and other types of devices are capable of outputting specific results to a user based on events or interactions occurring within a graphical environment such as during a game or another application.

However, these interface devices have a number of limitations. For example, the main haptic sensation provided by one such device is a vibration, and no force is generated between the user and the touch surface which could, for instance, prevent the user from moving over certain areas of the touch surface.

Other devices, such as, for example, a magnetic force-feedback system, do not allow a stylus to move over a two-dimensional surface.

SUMMARY OF THE INVENTION

Various exemplary embodiments of the systems and methods according to this invention provide for a force-feedback apparatus for generating a force-feedback between a stylus-type device and a magnetic surface. The apparatus includes a stylus-type device having an electromagnetic device disposed at a tip of the stylus-type device, a controller functionally coupled to the stylus-type device and to the magnetic surface, the controller being capable of generating a magnetic field between the stylus-type device and the magnetic surface to provide a haptic sensation to a user of the stylus-type device. According to various exemplary embodiments, the magnetic field generated by the controller varies based on the location of the stylus-type device over the magnetic surface and a predetermined function being performed by the user over the magnetic surface using the stylus-type device.

Moreover, according to various exemplary embodiments of this invention, this invention provides for a force-feedback apparatus for generating a force-feedback between a stylus-type device and a surface, that includes a stylus-type device having a ball arranged on one end, a controller functionally coupled to the stylus-type device and to the surface, the controller being capable of sending a signal to the stylus-type device, the signal being based on a location of the stylus-type device over the surface and objects displayed on being performed by the user over the surface, the ball being capable of freely rotating at the one end of the stylus-type device when the controller does not send a signal to the stylus-type device, and the stylus-type device having a force-feedback device capable of receiving a signal from the controller in order to apply a force to the ball to prevent the ball from freely rotating at the one end of the stylus-type device on the surface.

Also, according to various exemplary embodiments of this invention, a method of generating a force-feedback in an apparatus composed of a surface functionally coupled to a stylus-type device is provided, that includes moving the stylus-type device having a force-feedback device over the surface, controlling the force-feedback device with a controller functionally coupled to the stylus-type device and to the surface, applying a force between the stylus-type device and the surface via the force-feedback device, the force being determined at least by objects displayed on the surface.

Furthermore, according to various exemplary embodiments of this invention, this invention provides for a force-feedback generation system for generating a force-feedback between a stylus-type device and a surface, that includes the stylus-type device having a force-feedback device and capable of being moved over the surface, a controller functionally coupled to the stylus-type device and to the surface, the controller being capable of sending a signal to the force-feedback device to apply a force between the stylus-type device and the surface, and the force applied by the force-feedback device being determined by objects displayed on the surface.

Furthermore, according to various exemplary embodiments of this invention, a machine readable medium that provides instructions for moving a force-feedback stylus on the surface is provided, the instructions, when executed by a processor, caused the processor to perform operations that include bringing the stylus-type device having a force-feedback device over the surface, controlling the force-feedback device with a controller functionally coupled to the stylus-type device and to the surface and applying a force between the stylus-type device and the surface via the force-feedback device, the force being determined by objects displayed on the surface.

BRIEF DESCRIPTION OF THE DRAWINGS

Various exemplary of the systems and methods of this invention will be described in detail, with reference to the following figures, wherein.

DETAILED DESCRIPTION OF PREFERRED EMBODIMENTS

These and other features and advantages of this invention are described in, or are apparent from, the following detailed description of various exemplary embodiments of the systems and methods according to this invention.

Figure 1:
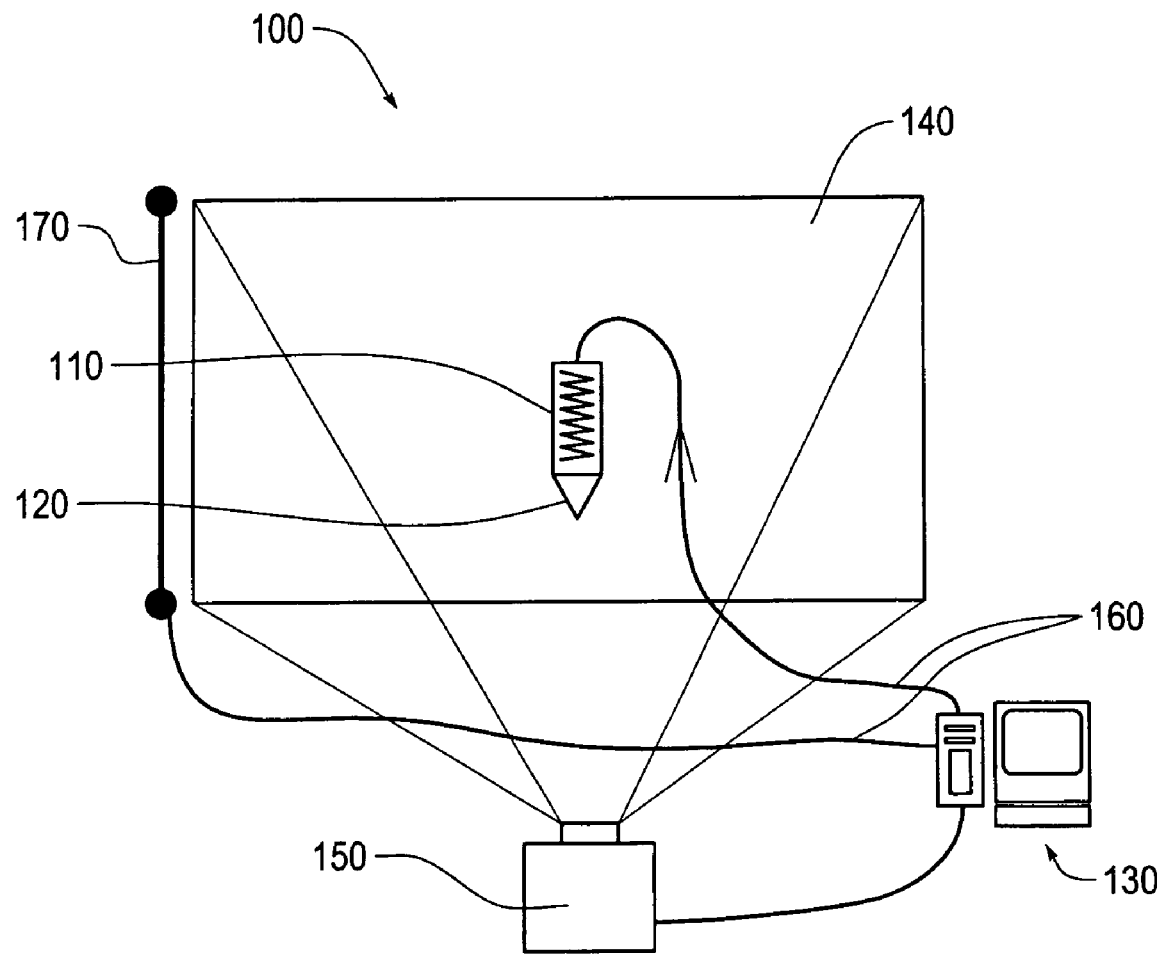
FIG. 1 is an illustration of an electromagnetic force-feedback stylus apparatus according to various exemplary embodiments of this invention.

FIG. 1 is an illustration of an electromagnetic stylus system 100 according to various exemplary embodiments of this invention. In FIG. 1, the electromagnetic stylus 110 is provided with an electromagnetic element 120 and is functionally coupled to a controller 130. According to various exemplary embodiments, the stylus 110 may be coupled to the controller 130 using one or more connecting wires 160. According to other exemplary embodiments, the stylus 110 may be wirelessly coupled to the controller 130. When operated over an magnetic surface 140, such as, for instance, an iron whiteboard, a force-feedback can be dynamically generated by the controller 130, giving users a sense of the stylus 110 encountering resistance at specific locations. By changing the magnetic field created by the controller 130, the user can feel different attractions of the stylus 110 to the surface 140.

According to various exemplary embodiments, the force-feedback generated by the controller 130 is based on a combination of the location of the stylus 110 over the surface 140 and a number of parameters. According to various exemplary embodiments, the parameters may include, specific patterns or features that are displayed on the surface 140, by a projector 150 that is functionally coupled to the stylus 110 through the controller 130, or a specific action of the stylus 110 over the surface 140. According to various exemplary embodiments, the features displayed on the surface 140 may include one or more of a contour, a map, a simulated sheet ("virtual sheet"), an area, and a design with a variety of lines and curves.

When a force is generated between the stylus 110 and the surface 140, according to various exemplary embodiments, the stylus 110 provides the user handling the stylus 110 with a haptic sensation according to at least the location of the stylus 110 on the surface 140. For example, in various exemplary embodiments, the haptic sensation can be a vibration or a pulse of the stylus 110, generation of heat or of chill in the stylus 110, or a brake-type or stop-like sensation of the stylus 110. According to various exemplary embodiments, the surface 140 and controller 130 can be functionally coupled to a plurality of styluses 110.

Also, the location of the stylus 110 can be tracked using a 2-D position sensing apparatus 170. Accordingly, by using the position sensing apparatus 170, the controller 130 can easily locate the stylus 110 on the surface 140 and determine the appropriate attraction force to be applied between the stylus 110 and the surface 140 at that specific location. Furthermore, a projector 150 can be used to project the screen of a host computer onto the surface 140.

Moreover, the wires 160 linking the computer 130 to both the stylus 110 and the position sensing device 170, can be replaced by a wireless connection, which would improve the usability of the stylus. Also, a wireless connection could allow multiple users to easily interact with the stylus 110 at the same time.

Figure 2:
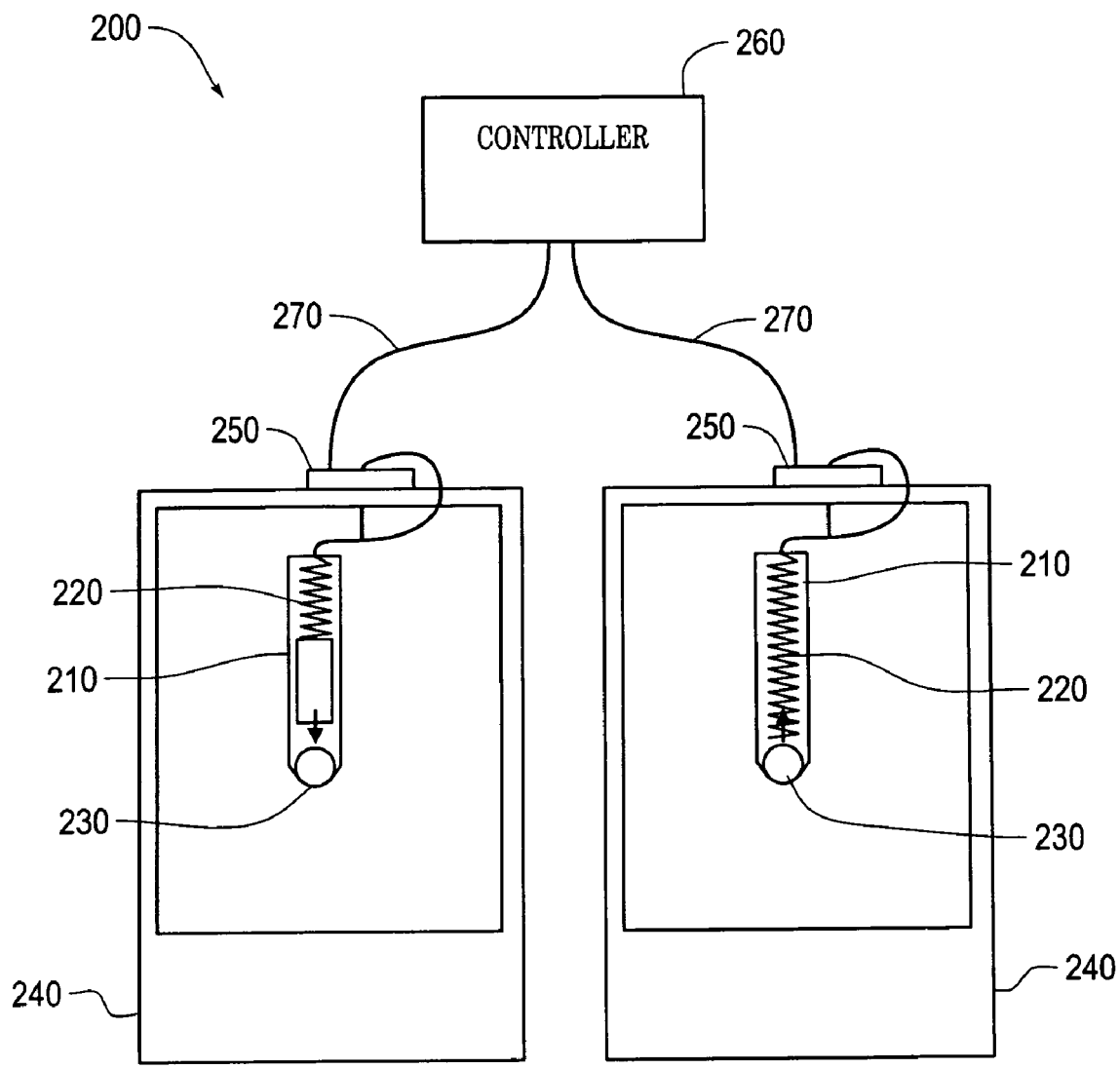
FIG. 2 is an illustration of a force-feedback stylus apparatus using a blocking ball tip according to various exemplary embodiments of this invention.

FIG. 2 illustrates a force-feedback stylus system which uses a blocking ball tip, according to various exemplary embodiments of this invention. According to various exemplary embodiments, a stylus with a blocking ball can be used over a surface that is not magnetic. Because a force-feedback stylus equipped with an electromagnetic tip as described above cannot be used on a surface that is not magnetic, another type of stylus is needed. In FIG. 2, a stylus 210 is equipped with a rotating ball 230 which is free to rotate at the tip of the stylus 210. When the rotating ball 230 is free to rotate, a user is able to move the stylus 210 freely on any surface, however when the rotating ball 230 is kept from freely rotating at the tip of the stylus 210, then the stylus 210 is kept from moving over a surface 240.

In order to create a force between the stylus and the surface 240, such as, for instance, the display surface of a personal digital assistant (PDA), a brake system is installed inside the stylus 210 in order to hinder the free rotation of the ball 230. The brake system, according to various exemplary embodiments, is a solenoid 220 that is linked to a serial port 250 and which is able to move inside the stylus in order to apply a certain pressure on the ball 230. The pressure applied on the ball 230, which is generated from a signal sent by the controller 260, results in preventing the ball 230 from freely rotating inside the tip of the stylus 210. According to various exemplary embodiments, the controller 260 is functionally coupled to both the stylus 210 and the surface 240. Moreover, the ability for the ball 230 to freely rotate inside the tip of the stylus 210 depends on the amount of pressure applied by the solenoid 220 and that originated from the controller 260. Accordingly, when the ball 230 is kept from freely rotating inside the tip of the stylus 210, the stylus 210 is kept from moving over the surface 240.

When operated over a non-magnetic surface 240, such as, for instance, a PDA, a force-feedback can be dynamically generated by the controller 230, giving users a sense of the stylus 210 encountering resistance at specific locations. By changing the ball-blocking force created by the controller 230, the user can field different attractions of the stylus 210 to the surface 240. According to various exemplary embodiments of this invention, the ball 230 has a rough texture.

According to various exemplary embodiments, the force-feedback generated by the controller 260 is the product of a combination of the location of the stylus 210 over the surface 240 and a number of parameters. According to various exemplary embodiments, the parameters that are the cause of the creation of a force between the stylus 210 and the surface 240 are, for instance, specific patterns or features that are displayed on the surface 240 or a specific action of the stylus 210 over the surface 240. According to various exemplary embodiments, the features displayed on the surface 240 are a contour, a map, a simulated sheet ("virtual sheet"), an area and a design with a variety of lines and curves. When a force is generated between the stylus 210 and the surface 240, according to various exemplary embodiments, the user handling the stylus 210 has a haptic sensation as the stylus 210, when held by the user, does not move over specific areas of the surface 240. Moreover, according to various exemplary embodiments, the haptic sensation can be a vibration or a pulse of the stylus 210, generation of heat or of chill in the stylus 210, or a brake-type or stop-like sensation of the stylus 210. According to various exemplary embodiments, the surface 240 and controller 230 can be functionally coupled to a plurality of styluses 210.

Alternatively, the location of the stylus 210 can be tracked using a 2-D position sensing apparatus. Accordingly, by using the position sensing apparatus, the controller 260 can easily locate the stylus 210 on the surface 240 and determine the appropriate attraction force to be applied between the stylus 210 and the surface 240 at that specific location. Furthermore, a projector can be used to project the screen of a host computer onto the surface 240.

Moreover, the wires 270 linking the controller 260 to both the stylus 210 and the position sensing device can be replaced by a wireless connection, which would improve the usability of the stylus. Also, a wireless connection could allow multiple users to easily interact with the stylus 210 over the surface 240 at the same time. Also, according to various exemplary embodiments, multiple styluses 210 can be used on the same surface 240.

According to various exemplary embodiments, such a stylus can be used for a variety of surfaces, and a force-feedback can be generated by a controller which generates an electromagnetic field that displaces the solenoid 220 inside the stylus 210 in order to apply pressure on the rotating ball 230.

Alternatively, a special screen protector can also be placed over the touch screen 240 in order to add friction between the ball tip 230 and the touch screen 240.

Based on the teachings described above, the force-feedback stylus, according to various exemplary embodiments of this invention, allows to perform the following tasks. The force-feedback stylus 110, according to various exemplary embodiments of this invention allows to simulate object mass, in the case of a whiteboard surface 140, where the electromagnet 120 is turned on and where the 2-D position sensing apparatus 170 transmits information such as, for instance, that the stylus 110 is at the border of a piece of paper, and hence prompts the controller 130 to exert a strong magnetic force between the stylus 110 and the whiteboard 140 in order to keep the stylus from moving outside of the piece of paper and, for instance, "stretch" the virtual piece of paper.

Moreover, according to various exemplary embodiments of this invention, it is possible to feel the boundaries of virtual objects described on the surface. For instance, an attraction force is turned on only when the stylus is within specific areas of the surface. Also, for instance in applications where a user has to fill in specific areas, the system according to various exemplary embodiments of this invention will, for instance, create such a high attraction force between the stylus 110 and the surface 140 that it would be almost impossible to move the stylus 110 outside a specific region. One application, according to various exemplary embodiments, would be to paint a region in freeform ink where the force would make it harder to move outside the specific region. Another application, according to various exemplary embodiments, is on scroll bars where it would be harder to move a scroll bar when information that is likely to be relevant or interesting is currently display, such as, for instance, highlighted search terms in the document.

Another application, according to various exemplary embodiments, is to guide a user that is moving a stylus 110 on a curve described on the surface 140. This effect, according to various exemplary embodiments, could be used to help users highlight text along the line in a freeform ink annotation system. This effect could also be used, according to various exemplary embodiments, to ease the selection of related stokes. The force-feedback would both tell the user that the system recognized these strokes as grouped, and also have the user continue the selection of strokes in the same group.

Simulating an object mass, as described above and according to various exemplary embodiments, could be used, for instance, in a VCR control commanded with a gesture interface where, for instance, a left stroke is to go back in time and a right stroke is to go forward in time. In this case, the force-feedback would indicate interesting pieces of material through time. These interesting pieces of material can be, according to various exemplary embodiments, those matching a specific user query such as specific ink strokes within a sheer canvas of freeform ink.

Figure 3:
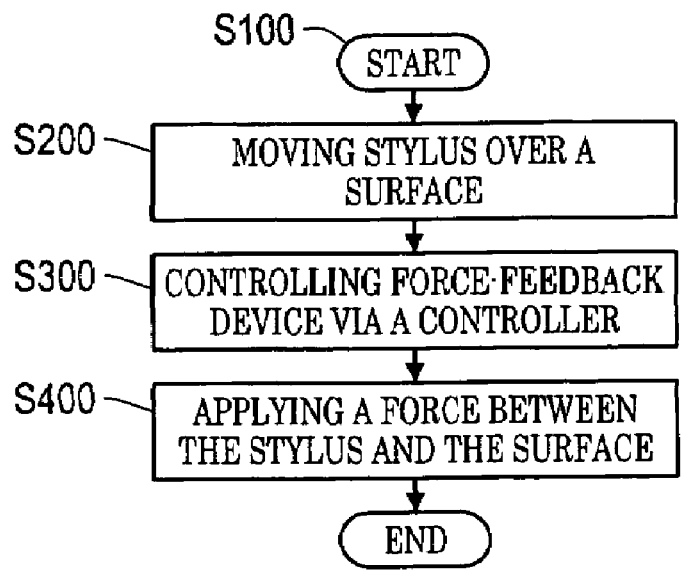
FIG. 3 is a flowchart illustrating a method of generating a force-feedback stylus between a stylus and a surface according to various exemplary embodiments of this invention.

FIG. 3 is a flowchart illustrating a method of using a force-feedback stylus according to various exemplary embodiments of this invention. The method starts at step S100 and continues to step S200. During step S200, a stylus is brought close to a surface and, according to various exemplary embodiments, can be moved over the surface. Control then continues to step S300. During step S300, the stylus is controlled via a controller that determines the location of the stylus over the surface and any relationship between the location of the stylus over the surface and objects displayed on the surface such as specific patterns or features displayed on the surface. According to various exemplary embodiments, the patterns or features displayed can be a contour, a map, a simulated sheet, an area or a design with multiple drawings.

Next, control continues to step S400. During step S400, a force is applied to the stylus by the controller based on the location of the stylus over the surface and also based on any specific pattern or design displayed on the surface. According to various exemplary embodiments, the controller may force a user of the stylus to fill in specific portions of a design, and will thus only generate a force-feedback to the stylus if the user attempts to fill in other portions of the design that are not designed to be filled in. According to various exemplary embodiments, the force generated by the controller is manifested by a force applied between the stylus and the surface, where the user finds it more difficult to move the stylus in areas other than the ones the user is supposed to apply the stylus to. For instance, if following a specific contour, the user will not be allowed to stray from the contour if the user's hand guides the stylus away from the contour.

According to various exemplary embodiment, the force generated produces a haptic sensation that can be felt by the user. In various exemplary embodiments, the haptic sensation can be a vibration of the stylus, a generation of heat or cold from the stylus, a noise generated from the stylus, and the like. Next, control continues to step S500, where the method ends. According to various exemplary embodiments, the intensity of the force and felt by the user depends on how far the user-guided stylus is from the position it should be. As such, there is no force if the user guides the stylus exactly on top of the contour that is supposed to be followed, and the force is maximum when the user guides the stylus out of the surface.

Figure 4:
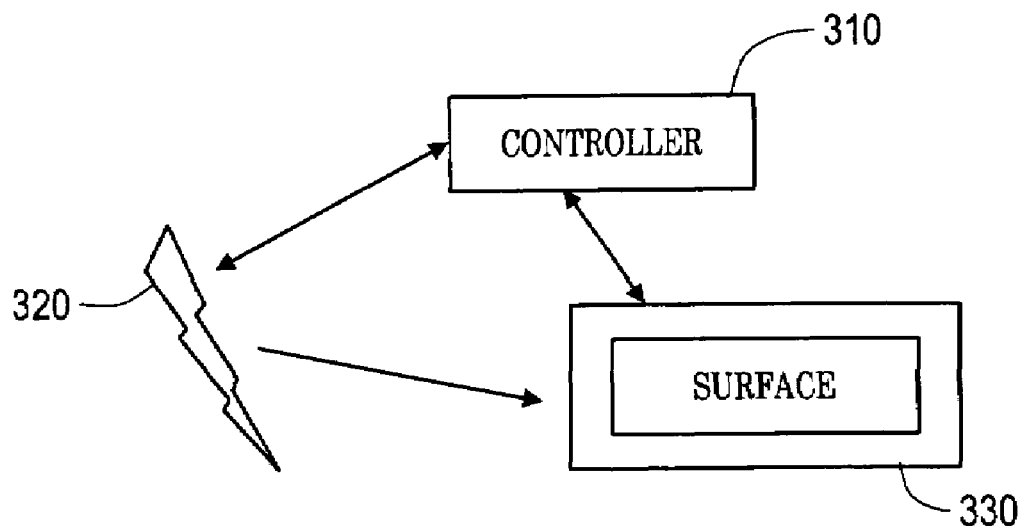
FIG. 4 is a block diagram illustrating a system of generating a force-feedback between a stylus and a surface according to various exemplary embodiments of this invention.

FIG. 4 is a block diagram illustrating a system of generating a force-feedback between a stylus and a surface according to various exemplary embodiments of this invention. According to various exemplary embodiments of this invention, a controller 310 is functionally coupled to a stylus 320 and a surface 320. The stylus 320 is capable is being moved over the surface 330. Also, according to various exemplary embodiments, the controller 310 is capable of sensing the position of the stylus 320 over the surface 330 and, based on objects displayed on the surface 330, generates a force between the stylus 320 and the surface 330. According to various exemplary embodiments, the force generated by the controller 310 between the stylus 320 and the surface 330 depends on specific patterns on the surface 330, such as, for instance, lines, contours, photographs, shapes, drawings and designs.

While the invention has been described in conjunction with exemplary embodiments, these embodiments should be viewed as illustrative, not limiting. Various modifications, substitutes, or the like, are possible within the spirit and scope of the invention.

What is claimed is:

1. A force-feedback apparatus for generating a force-feedback between a stylus-type device and a magnetic surface, comprising:

a stylus-type device having an electromagnetic device disposed at a tip of the stylus-type device;

a controller coupled to the stylus-type device, the controller being capable of generating a magnetic field between the stylus-type device and the magnetic surface to cause the stylus-type device to provide a haptic sensation to a user of the stylus-type device; and a projector functionally coupled to the stylus-type device through the controller and capable of projecting objects displayed on the magnetic surface, wherein the magnetic field generated by the controller varies based on one of a location of the stylus-type device over the magnetic surface and the objects displayed on the magnetic surface.

2. The apparatus of claim 1, wherein the objects displayed on the magnetic surface are one of: a pattern displayed on the magnetic surface; one or more features displayed on the magnetic surface; and type of action performed by the stylus-type device on the magnetic surface.

3. The method of claim 2, wherein the one or more features on the surface are at least one of a contour, a map, a simulated sheet, an area and a design with multiple aspects.

4. The apparatus of claim 1, wherein the stylus-type device is coupled to the controller using a coupling wire or wirelessly.

5. The apparatus of claim 1, wherein the magnetic surface is coupled to a plurality of stylus-type devices.

6. The apparatus of claim 1, wherein the haptic sensation varies in intensity based on the objects displayed on the magnetic surface.

7. The apparatus of claim 1, wherein the haptic sensation provided to the user comprises one or more of a vibration, a pulse, a stop-like sensation, a braking-type sensation, a heating sensation and a chilling sensation.

8. A method of generating a force-feedback to a user in an apparatus comprising a surface functionally coupled to a stylus-type device, the method comprising:
    monitoring motion of a stylus-type device over the surface, said stylus-type device having a force-feedback device incorporated therein;
    projecting objects displayed on the surface by a projector functionally coupled to the stylus-type device;
    controlling the force-feedback device with a controller functionally coupled to the stylus-type device and to the surface; and
    applying a force between the stylus-type device and the surface via the force-feedback device, the force being determined by the objects displayed on the surface to thereby provide a haptic feedback to the user from the stylus-type device,
    wherein the force is a magnetic force and the surface is a magnetic surface.

9. The method of claim 8, wherein the objects displayed on the surface are one of: a pattern displayed on the surface; one or more features displayed on the surface; and the type of action performed by the stylus-type device on the surface.

10. The method of claim 9, wherein the one or more features on the surface are at least one of a contour, a map, a simulated sheet, an area and a design with multiple aspects.

11. The method of claim 8, wherein the force-feedback device comprises an electromagnet.

12. The method of claim 8, wherein the force-feedback device comprises a ball that is capable of freely rotating.

13. The method of claim 12, wherein the ball has a rough texture.

14. The method of claim 12, wherein the force-feedback device is a solenoid that is capable of entering in contact with the ball.

15. The method of claim 12, wherein the force-feedback device is an electromagnetic brake that is capable of blocking the ball.

16. The method of claim 8, wherein the stylus-type device is controlled by the controller using one of a wire and a wireless coupling device.

17. The method of claim 8, wherein the surface is functionally coupled to a plurality of styluses.

18. The method of claim 10, wherein the contour is a freeform contour.

19. A machine-readable medium that provides instructions for generating a force-feedback, the instructions, when executed by a processor, cause the processor to perform operations comprising:
    monitoring the location of the stylus-type device over the surface, the stylus-type device having a force-feedback device incorporated therein;
    projecting objects displayed on the surface by a projector functionally coupled to the stylus-type device;
    controlling the force-feedback device with a controller functionally coupled to the stylus-type device and to the surface; and
    applying a force between the stylus-type device and the surface via the force-feedback device, the force being determined by the objects displayed on the surface, to thereby cause the stylus-type device to encounter resistance at specific locations on the surface,
    wherein the force is a magnetic force and the surface is a magnetic surface.

20. The machine-readable medium of claim 19, wherein the monitoring the location of the stylus-type device over the surface is by using a position sensing device functionally coupled to the controller.

21. The apparatus of claim 1, further comprising a position sensing device coupled to the controller for locating the stylus-type device on the magnetic surface.

22. The method of claim 8, wherein the monitoring the motion of the stylus-type device over the surface is by using a position sensing device functionally coupled to the controller.

* * * * *